G. N. HAYNIE.
DETACHABLE PETCOCK CONTROLLING DEVICE FOR MOTOR VEHICLES.
APPLICATION FILED MAR. 17, 1917.
1,267,545.
Patented May 28, 1918.
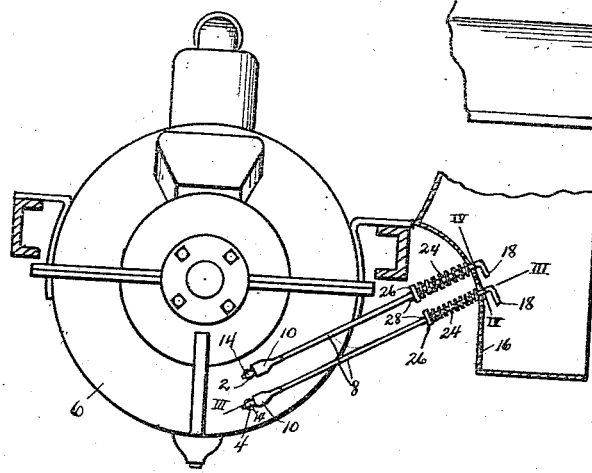
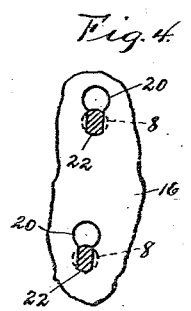
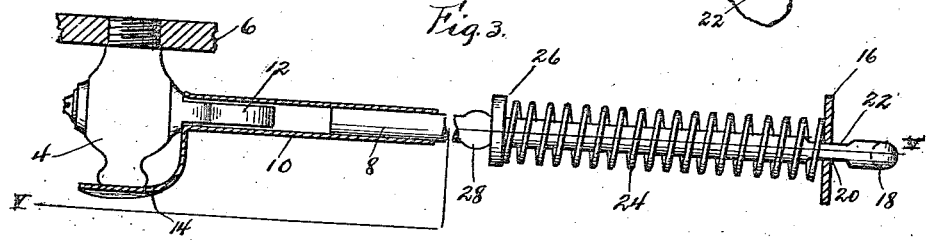
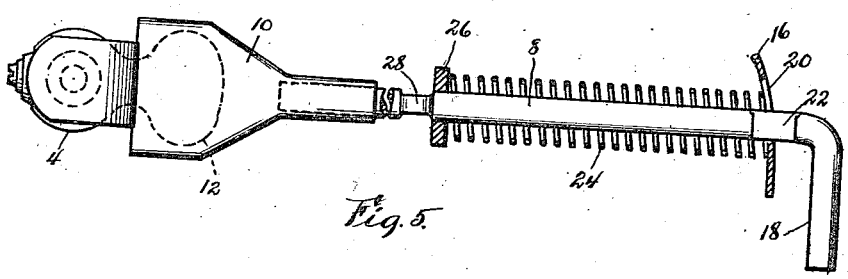
Witness:
R. L. Hamilton
Inventor,
Grant N. Haynie
By Chas. W. Gerard,
Attorney.

UNITED STATES PATENT OFFICE.

GRANT N. HAYNIE, OF HAMILTON, MISSOURI.

DETACHABLE PETCOCK-CONTROLLING DEVICE FOR MOTOR-VEHICLES.

1,267,545.

Specification of Letters Patent. Patented May 28, 1918.

Application filed March 17, 1917. Serial No. 155,575.

*To all whom it may concern:*

Be it known that I, GRANT N. HAYNIE, a citizen of the United States, residing at Hamilton, in the county of Caldwell, State of Missouri, have invented certain new and useful Improvements in Detachable Petcock - Controlling Devices for Motor - Vehicles, of which the following is a full and exact specification.

The present invention relates to valve controlling means, and aims to provide a device adapted to be detachably engaged with the valve and with the adjacent supporting structure, together with suitable resilient means for holding the device in proper relation to the valve.

It is a further object to devise an attachment of this character which will be especially adapted for use in connection with the pet cocks commonly provided with the crank case of certain types of motor vehicles, and so constructed as to be readily mounted in operative relation to the valves of such cocks and operated from the outside of the vehicle frame.

It is also an object to provide a valve controlling means which will have suitable provision for shielding the valve outlet during the time when the valve is closed.

It is also sought to devise a construction comprising but few parts and which will be economical and inexpensive to manufacture, and be adapted to be applied to motor vehicles with no change in the latter excepting for the provision of an opening for mounting one end of the device and permitting of its operation from the exterior of the vehicle frame.

With these general objects in view the invention will now be described with reference to the accompanying drawing illustrating one form of embodiment of the improvements, after which those features and combinations deemed to be novel will be set forth and defined in the appended claims.

In the drawing—

Figure 1 is a vertical sectional view of a portion of a motor vehicle construction illustrating an end view of the motor with a pair of devices embodying the present improvements associated with the pet cocks of the motor crank case;

Fig. 2 is a side view of a portion of the motor vehicle frame showing the position of the outer ends of said devices;

Figs. 3 and 4 are detail sectional views, on a larger scale, taken on the lines III—III and IV—IV, respectively, of Fig. 1; and Fig. 5 is a section taken on the line V—V of Fig. 3.

Referring to the drawing in detail, the valve controlling means is illustrated in connection with the pet cocks 2, 4, of a motor crank case 6 of a common design, which is constructed to maintain a supply of oil for lubricating purposes. Each of said controlling means comprises a rod 8 provided at one end with a socket piece 10 secured to the rod and formed to fit over the thumb-piece or stem 12 of the valve of the corresponding pet cock. Each socket piece 10 is also formed with a suitable guard 14 bent outward and projecting in position to shield the outlet from the pet cock at such times as the valve is closed, the drawing illustrating the position of the parts when the valves are closed.

The rods 8 are mounted in upwardly inclined position, as shown in Fig. 1, and are of appropriate length for projecting out through the run-board shield 16 of the vehicle body at one side of the car, where said rods are formed with the angularly bent portions 18 suitable for manual engagement and operation at the exterior of said shield. For accommodating these outer ends of the rods 8 the shield 16 is provided with the key-hole slots 20, and said rods are flattened at these points (as shown at 22, Fig. 4) to coöperate with the straight portions of said slots to lock said rods with the valves in closed position.

For holding the devices in the position shown and properly engaged with the pet cock valves, each rod 8 is fitted with a coil spring 24 having its outer end engaged with the inner face of said shield 16 at the corresponding opening 20 and the other end of said spring abutting against a washer 26 carried by the rod, which is provided with the flattened and expanded portion 28 adapted to form a stop for said washer. The action of the springs 24 thus tends to urge the rods in the direction of the pet cocks with the result that the socket pieces are maintained seated upon the stems 12 of the valves.

It will be understood that use is made of the pet cocks 2 and 4 in determining the position of the oil level in the crank case 6.

When oil is supplied to said crank case, the pet cock 4 is closed and the cock 2 left open and oil allowed to enter the crank case until it drips from the upper cock 2. The oil level should be maintained normally above the cock 4, which is used from time to time to test said level, and when oil fails to drip therefrom on opening of the same, indicating that the level of the oil has dropped below that point, the driver then knows that the oil supply in the crank case should soon be replenished. Without some means such as provided by the present improvements for opening and closing these pet cocks, this operation is awkward and inconvenient because of the position of the valves. The present devices, however, obviate this difficulty and the operation of the valves is rendered a very simple and easy matter. Moreover the devices are made up in the form of attachments which may be readily and quickly adjusted into operative position with relation to the valves, and also instantly detached at any time that it should be desired to remove the same for any purpose. The only provision which has to be made for attaching the devices in the position shown is the openings 20 in the run-board shield, through which openings the rods 8 are inserted from the inside, the springs 24 being somewhat compressed to bring the mouths of the sockets 10 over the valve stems, after which the devices will simply spring into proper engagement with the valves. The springs then serve to hold the parts in their proper operative relation and at the same time prevent any loose play or rattling of the parts. The provision of the guard 14 is also an improvement of advantage since the pet cocks are so much exposed to flying dust or mud that without being shielded their outlet openings tend to become more or less clogged, and the guards 14 keep these openings closed at all times when the valves are closed.

While the foregoing illustrates what is now deemed to constitute the preferred form of embodiment of the invention, the right is reserved to such formal changes and modifications as may fairly fall within the scope of the appended claims.

What I claim is:

1. A detachable valve operating device comprising, in combination with a supporting structure, a valve operating rod having one of its ends detachably engaged with said supporting structure and provided at its other end with means for removably engaging the stem of the valve, and a guard element associated with said valve engaging means and extending in position to shield the valve outlet when said valve is closed.

2. A detachable valve operating device comprising, in combination with a supporting structure, a valve operating rod detachably engaged with said supporting structure and having one of its ends provided with a socket element shaped to fit over the stem of the valve for removable engagement therewith, a guard element projecting from one side of said socket and extending in position to shield the valve outlet when said valve is closed, and a spring member carried by said rod in engagement with said supporting structure and urging said rod in the direction of said valve for holding said socket element in engagement with the valve stem.

3. A detachable pet cock controlling device for motor vehicles, comprising a valve operating rod having one end provided with means for removably engaging the stem of the valve, said means permitting a slight angular movement relatively to said valve, the other end of said rod extending through a portion of the body of the vehicle, said body portion of the vehicle being formed with a keyhole slot and said rod having a flattened portion adapted to fit the straight portion of the slot for locking the rod with the valve in closed position, the rounded portion of said slot being of a diameter equal to that of the rod to permit shifting of the rod thereinto and turning of said rod to operate the valve.

In testimony whereof I hereto affix my signature.

GRANT N. HAYNIE.